United States Patent
Boissac et al.

(10) Patent No.: US 7,752,704 B2
(45) Date of Patent: Jul. 13, 2010

(54) DEFORMABLE CRANK FOR WINDSCREEN WIPER MECHANISM, COMPRISING AN OBLONG QUADRILATERAL HOLE

(75) Inventors: Jean-Paul Boissac, Châtellerault (FR); Joël Pain, Naintré (FR); Florent Meurville, Châtellerault (FR)

(73) Assignee: Valeo Systemes d'Essuyage, La Verriere (FR)

( * ) Notice: Subject to any disclaimer, the term of this patent is extended or adjusted under 35 U.S.C. 154(b) by 1155 days.

(21) Appl. No.: 10/571,976

(22) PCT Filed: Sep. 7, 2004

(86) PCT No.: PCT/EP2004/009957

§ 371 (c)(1), (2), (4) Date: Mar. 15, 2006

(87) PCT Pub. No.: WO2005/025953

PCT Pub. Date: Mar. 24, 2005

(65) Prior Publication Data

US 2007/0033762 A1 Feb. 15, 2007

(30) Foreign Application Priority Data

Sep. 15, 2003 (FR) .................................. 03 10818

(51) Int. Cl.
*B60S 1/24* (2006.01)
*B60S 1/18* (2006.01)

(52) U.S. Cl. ..................... 15/250.31; 15/250.3; 74/600; 74/42

(58) Field of Classification Search ................. 15/250.3, 15/250.31, 250.27; 74/42, 43, 594.1, 595, 74/600; D12/123
See application file for complete search history.

(56) References Cited

U.S. PATENT DOCUMENTS 2,894,774 A 7/1959 Dudash
7,496,987 B2 * 3/2009 Boissac ..................... 15/250.3

FOREIGN PATENT DOCUMENTS

| DE | 26 47 510 | 4/1978 |
| EP | 0 904 997 | 3/1999 |
| FR | 1 225 534 | 7/1960 |
| FR | 2 835 496 | 8/2003 |

* cited by examiner

*Primary Examiner*—Gary K Graham
(74) *Attorney, Agent, or Firm*—Osha • Liang LLP

(57) ABSTRACT

The invention relates to a crank (14) which is intended for the windscreen wiper mechanism of a motor vehicle. The inventive crank is of the type that comprises a horizontal body (16) having a first end (14a) which is linked in rotation to a wiper arm and a second end (14b) which is articulated to a connecting rod. The aforementioned body (16) comprises: a segment (22) which can be deformed in order to adjust the distance between the ends (14a, 14b) of the crank (14), and a longitudinal oblong hole (24) which divides the aforementioned segment (22) into two deformable longitudinal branches (26) which are symmetrical in relation to a center line of said segment (22). The invention is characterized in that the oblong hole (24) takes the form of a quadrilateral with two essentially-perpendicular diagonals (E1, E2), the larger diagonal (E1) extending along the main axis (C) of symmetry of the segment (22) and intersecting the small diagonal (E2) at the midpoint thereof.

8 Claims, 2 Drawing Sheets

DEFORMABLE CRANK FOR WINDSCREEN WIPER MECHANISM, COMPRISING AN OBLONG QUADRILATERAL HOLE

The invention relates to a crank belonging to a linkage of a windscreen wiper mechanism, which is suitable for being elastically deformed in order to adjust the amplitude of the wiping movement.

The invention relates more particularly to a crank belonging to a linkage for transmitting the movement of a wiping mechanism of a motor vehicle, of the type that comprises a body that extends in a generally horizontal plane, a first end which is linked in rotation to a wiping arm that revolves around a generally vertical axis, and a second end which is articulated to a connecting rod of the linkage, of the type in which the body comprises a segment that can be deformed in a permanent fashion in order to adjust the distance between the first and second ends of the crank, as well as an oblong hole with a generally longitudinal orientation which divides the segment into two deformable longitudinal branches, globally symmetrical in relation to a central longitudinal axis of the segment.

Such mechanisms with connecting rod(s) and crank(s) can be found in driving devices in which an electric motor, possible associated with a reduction gear, drives in an alternating sweeping movement at least one windscreen wiper solidly attached to a driving shaft, which is mounted in rotation in relation to the vehicle.

With the help of a mechanism with connecting rod(s) and crank(s) it is possible, for example, to transform a continuous rotating movement of the output shaft of the driving motor into an alternating rotating movement of the driving shaft of each windscreen wiper.

The geometry and the kinematics of this mechanism, and mainly the length of the cranks, determine the angular trajectory of each windscreen wiper. By modifying this geometry, it is possible to obtain, from a single output movement of the motor's output shaft, two different angular trajectories for each of the two windscreen wipers.

It turns out, therefore, that it is particularly important to be able properly to control the geometry of the mechanism and mainly the length of the connecting rods and the cranks which are articulated with each other by means of ball joints, but also the positioning of the various elements in relation to each other.

And yet, from one mechanism to the next, it is possible for dispersions to appear in the various characteristic dimensions of the mechanism, which result from unsatisfactory angular trajectories of the windscreen wiper.

Document FR 02 01367, registered in the name of the applicant, describes a crank that can be deformed in a permanent fashion in order to modify and adjust the distance between its two ends.

With this aim, an intermediate segment of the crank comprises an oblong hole that delimits two opposing branches and, by deforming these branches, it is possible to modify the length of the crank.

According to this document, the branches are initially rectilinear such that it is necessary for them to be deformed previously in order for it to be possible subsequently to increase the distance between the ends of the crank. In addition, it is not possible to increase this distance beyond the initial distance at the output of the production line.

Furthermore, at the end of the prior deformation of the branches, they are curved in such a way that it becomes particularly complicated to straighten them out.

The length of the crank is generally modified when the wiping device is mounted on the vehicle. The access to the crank is then rather complicated, which further increases the difficulty of the step in which the length of the crank is adjusted.

The invention aims to provide a crank of a windscreen wiper mechanism that enables an increase in the distance between its ends, without any major difficulties.

With this aim in mind, the invention provides a crank of the type described previously, characterised in that the oblong hole has a generally quadrilateral shape, in which the two diagonals are generally perpendicular, the large diagonal matching the main axis of symmetry of the segment, and intersecting the small diagonal at its midpoint.

According to other characteristics of the invention:
- the oblong hole is in the shape of a diamond in which the large diagonal matches the main axis of the segment;
- the area of the section of each branch is globally constant throughout the length of the branch;
- the area of the section of each branch at the level of at least one angle of the oblong hole is smaller than the vertical cross-section of the branch between the angles of the oblong hole;
- the first end is made from a globally horizontal end segment, and the area of the cross-section of each branch is globally equal to ⅓ of the section of the end segment;
- the segment is shifted longitudinally towards an end of the crank;
- the segment is shifted longitudinally towards the send end of the crank;
- the internal vertical wall of the oblong hole is curved at the level of the concave angles of the oblong hole;
- the crank is made in the shape of a flat horizontal plate.

The invention also provides a wiping mechanism for a motor vehicle comprising a linkage for transmitting the movement, characterised in that the linkage comprises at least one deformable crank as described previously.

Further characteristics and advantages of the invention will appear from reading the following detailed description, for the understanding of which the appended drawings can be consulted, among which:

For the description of the invention, the vertical, longitudinal and transversal directions will be used, in a non-exhaustive fashion, following the V, L and T markers shown in the figures.

In the following description, all identical, similar or analogous elements will be designated using the same reference numbers.

Figure 1:
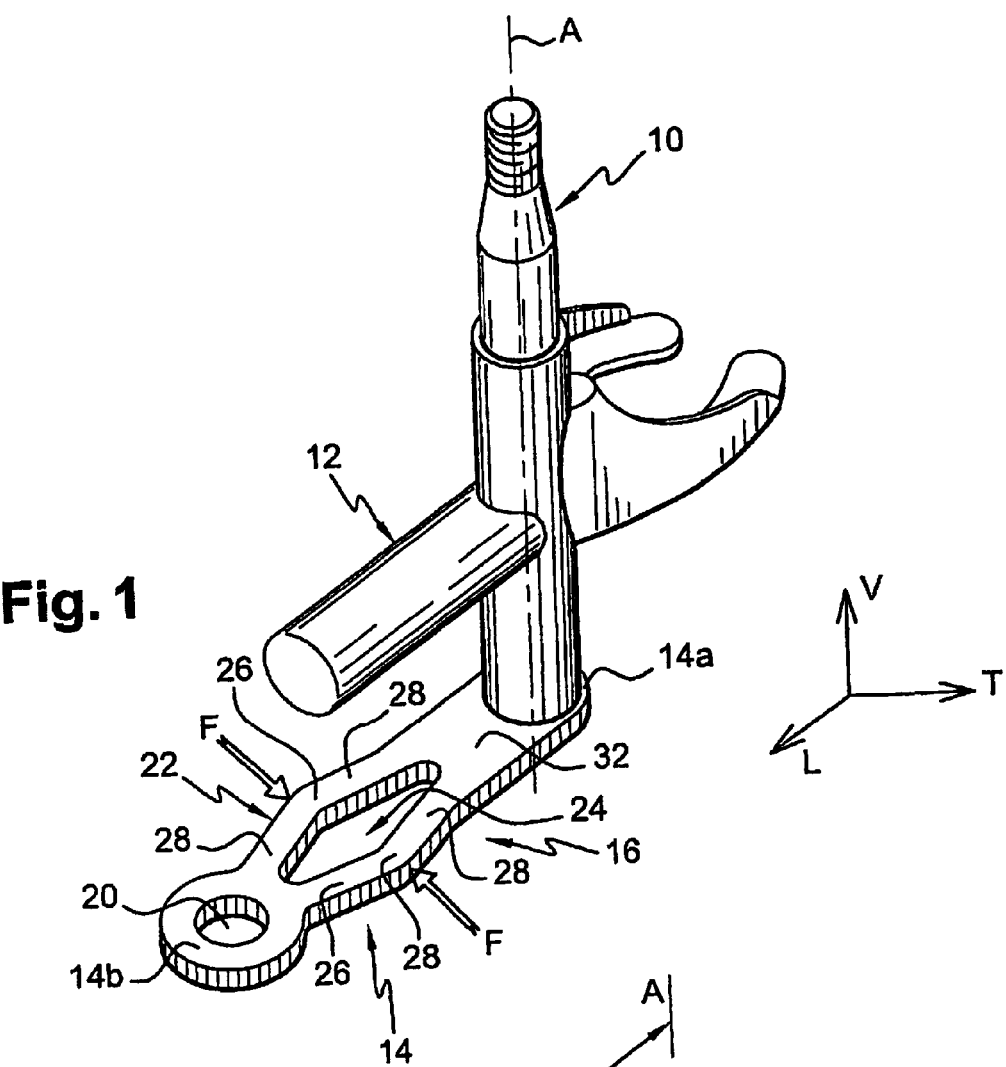
FIG. 1 is a schematic representation in perspective of the mounting of the driving shaft of a wiping mechanism that comprises a crank according to the invention.

FIG. 1 shows a driving shaft 10 that is a part of the wiping mechanism of the windscreen of a motor vehicle (not shown). The shaft 10 is guided in an alternating rotating movement around its main axis A, which is globally vertical, by means of a guiding plate 12 which is fixed to a structural component of the body shell (not shown) of the vehicle.

The shaft 10 is connected by its upper end 10s to a wiping arm (not shown) and by its lower end 10i to a crank 14 for driving it in an alternating movement, which is part of a linkage of the wiping mechanism.

Figure 2:
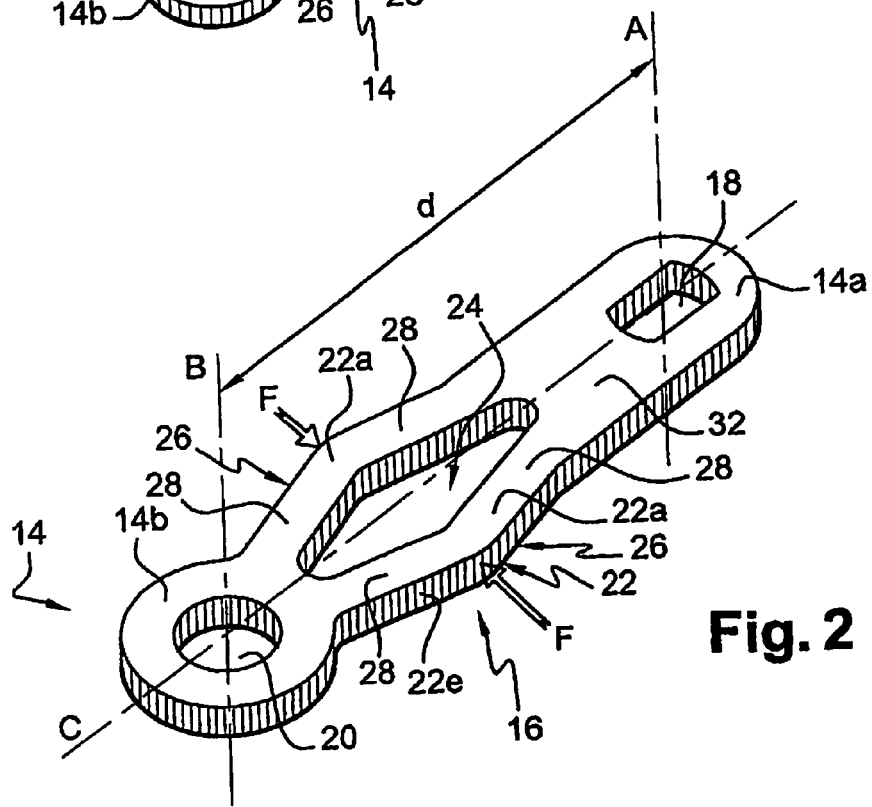
FIG. 2 is a schematic representation in perspective of the crank shown in FIG. 1.
Figure 3:
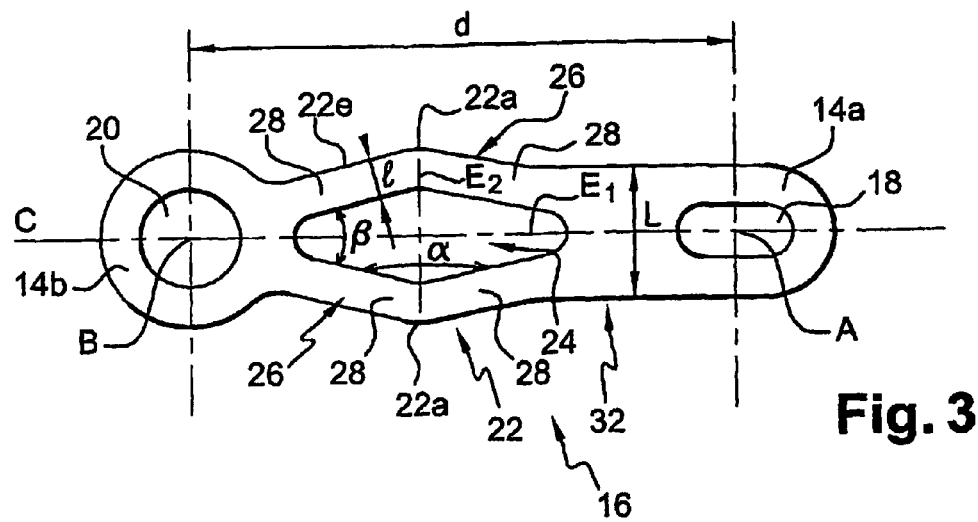
FIG. 3 is an outline sketch of the crank shown in FIG. 2.

As can be seen in greater detail in FIG. 2, the crank 14 is a flat element that extends horizontally, and which comprises a central body 16, a first end 14a which is linked to the shaft 10 and a second end 14b which is linked to a connecting rod (not shown) of the linkage.

The crank 14 is solidly attached in rotation to the shaft 10. For this purpose, its first end 14a comprises an opening 18 that is generally centred on the main axis A of the shaft 10.

The opening 18 in this case has an elongated shape, although it can have any other shape whatsoever, preferably not circular. The opening 18 receives the bottom end 10i of the shaft 10, which has a complementary shape, so as to solidly attach the shaft 10 in rotation to the crank 14 around the vertical axis A.

The second end 14b of the crank 14 is mounted so as to be articulated on the connecting rod of the linkage. For this reason, it comprises a circular hole 20 with a main axis B, which matches the main articulation axis of the crank 14 on the connecting rod.

The body 16 of the crank 14 extends between the two ends 14a, 14b and, in this case, is globally rectilinear, with a main axis of symmetry C in a globally longitudinal orientation. However, it is assumed that the invention is not limited to this embodiment of the crank 14, and that the body 16 can be not rectilinear, without departing from the scope of the invention.

The body 16 comprises a deformable segment 22 which can be deformed in a permanent fashion, so as to be able to adjust the distance "d" between the first and second ends 14a, 14b of the crank, in other words, the distance "d" between the axes A, B of the shaft 10 and of the hole 20.

For this purpose, the deformable segment 22 comprises an oblong hole 24 with a generally longitudinal orientation, which divides the deformable segment 22 into two deformable longitudinal branches 26, which are symmetrical in relation to a central line C of the deformable segment 22, in other words, in relation to the central vertical plane of the crank 14.

The operation of deforming the deformable segment 22 that enables the distance "d" to be increased consists of applying a force F at the level of each angle 22a of the deformable segment 22, which is situated at one end of the small diagonal of the diamond. The two forces F oppose each other and have the effect of bringing the two angles or apices 22a of the deformable segment 22 closer, in other words, they have the effect of reducing the length of the small diagonal E2 of the oblong hole 24.

Since the branches 26 have a constant section throughout their entire length, the diamond shape of the oblong hole 24 implies each branch 26 being made up of two consecutive segments 28, which are tilted in relation to each other at an obtuse angle "α" and which each form a side of the diamond that delimits the oblong hole 24.

During the deformation of the deformable segment 22, the segments 28 remain rectilinear, the deformations therefore take place at the level of each end of the segments 28, in other words, at each angle of the oblong hole 24. Thus, during the deformation of the deformable segment 22 to obtain an increase in the distance "d", the angle "α" which is formed at either end of the small diagonal E2, and which is delimited by the two segments 28 of the same branch 26 increases, and the acute angle "β" which is delimited by two consecutive segments 28 each belonging to one of the two branches 26, at the level of either end of the large diagonal E1 is reduced.

In order to limit the internal constraints to which the deformable segment 22 is subjected after being deformed, the internal vertical wall of the oblong hole 24 is curved at the level of the concave angles of the oblong hole 24, in other words, at the intersection of two consecutive segments 28 of the two branches 26.

According to a preferred embodiment of the invention, the crank 14 is made in the shape of a flat horizontal plate.

Thus, the crank 14 has a constant thickness throughout its entire surface. Due to this, the characteristic of the crank 14 according to which the area of the section of each branch 26 is constant throughout the entire length of the branch 26 means that the transversal dimension "l" of each branch 26 is constant throughout the entire length of the branch 26.

Figure 4:
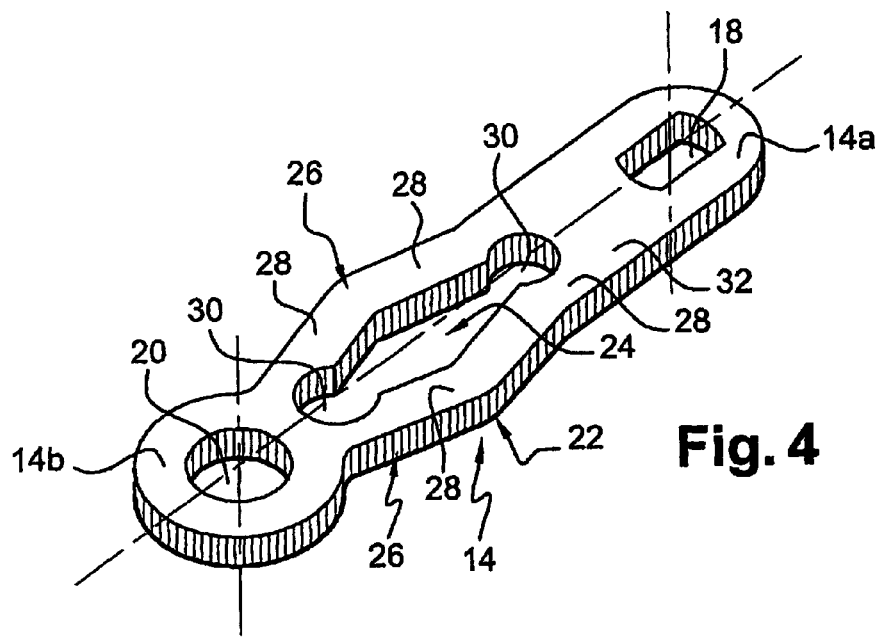
FIG. 4 is a similar view to that shown in FIG. 2, showing an alternative embodiment of the crank.

FIG. 4 shows an alternative embodiment of the invention according to which the branches 26 comprise areas 30 with low resistance to deformation, which make it possible to reduce the value of the forces F to be applied to the deformable segment 22 in order for it to deform.

According to a preferred embodiment of this alternative, the areas 30 with low resistance to deformation are arranged at the level of the angles or apices of the oblong hole 24, which allows the segments 28 of the crank to remain rectilinear.

The areas 30 with low resistance to deformation are areas for which the area of the section of the branch associated at the level of the considered angle of the oblong hole 24 is smaller than the area of the cross-section of the branch 24 between the angles of the oblong hole 24.

Here, the areas of low resistance to deformation are arranged at the level of the two angles of the oblong hole 24 situated at the ends of the large diagonal E1 of the oblong hole 24, and they consist globally of two cylindrical perforations 30 with a vertical axis of revolution, which pass through the crank 14.

Due to the presence of the oblong hole 24, the mechanical resistance of the crank 14 is reduced at the level of the deformable segment 22. Since the crank 14 is mainly subjected to a torque of resistance around the axis A coming from the shaft 10, and to a globally transversal force coming from the connecting rod, which is applied at the level of the centre of the second hole 20 of the second end 14b of the crank 14, it is particularly advantageous to shift the deformable segment 22 longitudinally so that it is subjected to smaller forces.

Thus, the deformable segment 22 is subjected to less considerable forces when it is shifted longitudinally towards the second end 14b of the crank 14.

The dimensions of the branches 26 and more particularly the area of the cross-section of each branch 26 make it possible to determine the mechanical resistance of the deformable segment 22 to these forces and thus the mechanical resistance of the crank 14.

This is why, according to a preferred embodiment of the invention, the area of the cross-section of each branch 26 is globally equal to one third of the area of the cross-section of a second segment 32 of the body 16 of the crank 14, which longitudinally extends the deformable segment 22. In other words, since the crank 14 is made in the shape of a flat horizontal plate, the transversal dimension "l" of a branch 26 is equal to one third of the transversal dimension "L" of the second segment.

Figure 5:
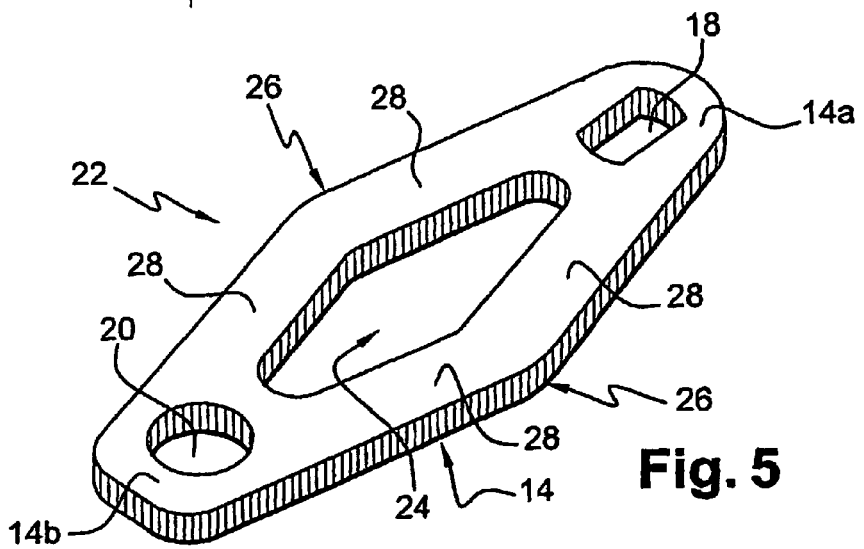
FIG. 5 is a view similar to that shown in FIG. 2, showing another alternative embodiment of the crank.

FIG. 5 shows another alternative embodiment of the crank 14, according to which the external profile of the crank 14 is also in the shape of a diamond, which provides an increase in the rigidity of the crank 14.

The crank 14 according to the invention makes it possible to modify the overall length in a permanent fashion, in order to adjust the sweeping angle of the wiping arm.

Such a crank has a relatively straightforward design, and the step in which its length is modified can be implemented easily during the assembly stage.

The invention claimed is:

1. A crank belonging to a linkage for transmitting the movement of a wiping mechanism of a motor vehicle, the crank comprising:
   a body that extends in a generally horizontal plane, a first end which is linked in rotation to a wiping arm that revolves around a generally vertical axis, and a second end which is articulated to a connecting rod of the linkage,
   wherein the body comprises a segment that can be deformed in a permanent fashion in order to adjust the distance between the first and second ends of the crank, and an oblong hole with a generally longitudinal orientation which divides the segment into two deformable longitudinal branches, globally symmetrical in relation to a central longitudinal axis of the segment, wherein an area of a transverse cross-section of each branch is globally constant throughout a length of the longitudinal branches between concave angles of the hole, and wherein the area of the transverse cross-section of each branch is smaller at the concave angles than between the concave angles of the oblong hole,
   wherein the oblong hole has a quadrilateral shape comprising a large diagonal and a small diagonal which are perpendicular to each other, the large diagonal matching a main axis of symmetry of the segment and intersecting the small diagonal at a midpoint of the small diagonal.

2. The crank according to claim 1, wherein the oblong hole is in the shape of a diamond in which the large diagonal matches the main axis of the segment.

3. The crank according to claim 1, wherein the first end is made from a globally horizontal end segment, and in that the area of the cross-section of each branch is globally equal to ⅓ of the section of the end segment.

4. The crank according to claim 1, wherein the segment is shifted longitudinally towards an end of the crank.

5. The crank according to claim 4, wherein the segment is shifted longitudinally towards the second end of the crank.

6. The crank according to claim 1, wherein an internal vertical wall of the oblong hole is curved at a level of concave angles of the oblong hole.

7. The crank according to claim 1, wherein the crank is made in a shape of a flat horizontal plate.

8. A wiping mechanism of a motor vehicle comprising:
   a linkage for the transmission of movement, characterised in that the linkage comprises at least one crank comprising a body that extends in a generally horizontal plane, a first end which is linked in rotation to a wiping arm that revolves around a generally vertical axis, and a second end which is articulated to a connecting rod of the linkage,
   wherein the body comprises a segment that can be deformed in a permanent fashion in order to adjust the distance between the first and second ends of the crank, as well as an oblong hole with a generally longitudinal orientation which divides the segment into two deformable longitudinal branches, globally symmetrical in relation to a central longitudinal axis of the segment, wherein an area of a transverse cross-section of each branch is globally constant throughout a length of the longitudinal branches between concave angles of the hole, and wherein the area of the transverse cross-section of each branch is smaller at the concave angles than between the concave angles of the oblong hole,
   wherein the oblong hole comprises a quadrilateral shape comprising a large diagonal and a small diagonal perpendicular to each other, the large diagonal matching a main axis of symmetry of the segment and intersecting the small diagonal at a midpoint of the small diagonal.

* * * * *

UNITED STATES PATENT AND TRADEMARK OFFICE
CERTIFICATE OF CORRECTION

PATENT NO. : 7,752,704 B2
APPLICATION NO. : 10/571976
DATED : July 13, 2010
INVENTOR(S) : Jean-Paul Boissac et al.

It is certified that error appears in the above-identified patent and that said Letters Patent is hereby corrected as shown below:

In Claim 1, Column 5, Lines 16-22, the lines appear as "wherein an area of transverse cross-section of each branch is globally constant throughout a length of the longitudinal branches between concave angles of the hole, and wherein the area of the transverse cross-section of each branch is smaller at the concave angles than between the concave angles of the oblong hole," and should read --wherein an area of a section of each branch is globally constant throughout a length of the longitudinal branches, and wherein the area of the section of each branch is smaller than the vertical cross-section of the branch between concave angles of the oblong hole,-- and, In Claim 8, Column 6, Lines 24-29, the lines appear as "wherein an area of transverse cross-section of each branch is globally constant throughout a length of the longitudinal branches between concave angles of the hole, and wherein the area of the transverse cross-section of each branch is smaller at the concave angles than between the concave angles of the oblong hole," and should read --wherein an area of a section of each branch is globally constant throughout a length of the longitudinal branches, and wherein the area of the section of each branch is smaller than the vertical cross-section of the branch between concave angles of the oblong hole,--.

Signed and Sealed this

Seventh Day of September, 2010

David J. Kappos
*Director of the United States Patent and Trademark Office*